United States Patent
Kim et al.

(10) Patent No.: US 7,336,953 B2
(45) Date of Patent: Feb. 26, 2008

(54) SYSTEM AND METHOD FOR DETERMINING HANDOVER AT A BASE STATION REQUEST IN A BROADBAND WIRELESS ACCESS COMMUNICATION SYSTEM

(75) Inventors: So-Hyun Kim, Suwon-si (KR); Chang-Hoi Koo, Seongnam-si (KR); Jung-Je Son, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 380 days.

(21) Appl. No.: 10/795,113

(22) Filed: Mar. 5, 2004

(65) Prior Publication Data

US 2004/0176094 A1   Sep. 9, 2004

(30) Foreign Application Priority Data

Mar. 8, 2003   (KR)   ............... 10-2003-0014643

(51) Int. Cl.
*H04Q 7/20*   (2006.01)
(52) U.S. Cl. ............ 455/438; 455/437; 455/436; 455/442; 370/331; 370/332
(58) Field of Classification Search ........ 455/436, 455/438, 442, 437; 370/331, 332
See application file for complete search history.

(56) References Cited

U.S. PATENT DOCUMENTS 7,042,858 B1 * 5/2006 Ma et al. .............. 370/331

FOREIGN PATENT DOCUMENTS

WO   WO 99/43178   8/1999

OTHER PUBLICATIONS

Kitroser et al., "IEEE 802.16e Handoff draft", Mar. 13, 2003.*
Itzik Kitroser et al., "IEEE802-16e Mobility Enhancements," Jan. 14, 2003, pp. 1-13.*
Chuah et al., "Integrated Dynamic Radio Resource Management", Vehicular Technology Conference, 1995 IEEE 45th, vol. 2, Jul. 25-28, 1995, pp. 584-588.
Chuah et al., "Evaluation of a Minimum Power Handoff Algorithm", Personal, Indoor and Mobile Radio Communications, 1995, PIMRC'95, Wireless: Merging onto the Information Superhighway, Sixth IEEE International Symposium on, vol. 2, Sep. 27-29, 1995, pp. 814-818.

(Continued)

*Primary Examiner*—Joseph Feild
*Assistant Examiner*—Pierre-Louis Desir
(74) *Attorney, Agent, or Firm*—The Farrell Law Firm, PC

(57) ABSTRACT

A broadband wireless access communication system in which a subscriber station (SS) sends a serving base station (SBS) a handover request to neighbor base stations (NBSs) having a CINR satisfying a handover condition, in response to a handover scan request message, and performs the handover to a particular NBS that transmits a handover response. The SBS transmits the handover scan request message to the SS, sends a handover connection request to NBSs in an order determined by CINRs reported from the SS, and sends, to the SS, information on a particular NBS upon receiving a handover connection response with ACK information from the particular NBS. The particular NBS determines whether it can support handover of the SS, in response to the handover connection request, and sends the handover connection response with the ACK information to the SBS, if it can support handover of the SS.

18 Claims, 11 Drawing Sheets

OTHER PUBLICATIONS

Meulenhof et al., "Handover in a High-Speed Wireless ATM Based LAN", Vehicular Technology Conference, 1999, IEEE VTS 50th, vol. 3, Sep. 19-22, 1999, pp. 1730-1734.

Kitroser et al., "IEEE 802.16e Mobility Enhancements", Jan. 10, 2003.

Kitroser et al., "IEEE 802.16e Handoff Draft", Mar. 13, 2003.

* cited by examiner

SYSTEM AND METHOD FOR DETERMINING HANDOVER AT A BASE STATION REQUEST IN A BROADBAND WIRELESS ACCESS COMMUNICATION SYSTEM

PRIORITY

This application claims priority under 35 U.S.C. § 119 to an application entitled "System and Method for Determining Handover at Request of Base Station in a Broadband Wireless Access Communication System" filed in the Korean Intellectual Property Office on Mar. 8, 2003 and assigned Serial No. 2003-14643, the contents of which are incorporated herein by reference.

BACKGROUND OF THE INVENTION

1. Field of the Invention

The present invention relates generally to a broadband wireless access communication system, and in particular, to a system and method for determining a handover at the request of a base station in a broadband wireless access communication system employing Orthogonal Frequency Division Multiplexing (OFDM).

2. Description of the Related Art

In a 4$^{th}$ generation (4G) communication system, active research is being conducted on technology to provide users with services guaranteeing various qualities of service (QoSs) at a data rate of about 100 Mbps. The current 3$^{rd}$ generation (3G) communication system generally supports a data rate of about 384 Kbps in an outdoor channel environment having a relatively poor channel environment, and supports a data rate of a maximum of 2 Mbps even in an indoor channel environment having a relatively good channel environment. A wireless local area network (LAN) system and a wireless metropolitan area network (MAN) system generally support a data rate of 20 Mbps to 50 Mbps. Therefore, in the current 4G communication system, the active research is being carried out on a new communication system securing mobility and QoS for the wireless LAN system and the wireless MAN system supporting a relatively high data rate in order to support high-speed services the 4G communication system aims to provide.

Due to its broad service coverage and high data rate, the wireless MAN system is suitable for high-speed communication services. However, because the mobility of a user or a subscriber station (SS), is not taken into consideration, a handover caused by fast movement of the subscriber station is also not considered in the system.

A communication system proposed in IEEE (Institute of Electrical and Electronics Engineers) 802.16a performs a ranging operation between a subscriber station and a base station (BS), for communication. A configuration of the communication system proposed in the IEEE 802.16a according to the prior art will now be described with reference to FIG. 1.

FIG. 1 is a diagram schematically illustrating a configuration of a broadband wireless access communication system employing Orthogonal Frequency Division Multiplexing (OFDM)/Orthogonal Frequency Division Multiple Access (OFDMA) (hereinafter referred to as "OFDM/OFDMA broadband wireless access communication system"). More specifically, FIG. 1 is a diagram schematically illustrating a configuration of an IEEE 802.16a/IEEE 802.16e communication system.

Before a description of FIG. 1 is given, it should be noted that the wireless MAN system is a broadband wireless access (BWA) communication system, and has broader service coverage and supports a higher data rate compared with the wireless LAN system. The IEEE 802.16a communication system is a communication system employing OFDM and OFDMA for supporting a broadband transmission network to a physical channel of the wireless MAN system. That is, the IEEE 802.16a communication system is an OFDM/OFDMA broadband wireless access communication system. The IEEE 802.16a communication system, applying OFDM/OFDMA to the wireless MAN system, transmits a physical channel signal using a plurality of subcarriers, thereby making it possible to support high-speed data communication. The IEEE 802.16e communication system considers mobility of a subscriber station in addition to characteristics of the IEEE 802.16a communication system. However, no specification has been proposed for the IEEE 802.16e communication system. As a result, the IEEE 802.16a communication system and the IEEE 802.16e communication system are both an OFDM/OFDMA broadband wireless access communication system, and for the convenience of explanation, the description will be made with reference to both the IEEE 802.16a communication system and the IEEE 802.16e communication system.

Referring to FIG. 1, the IEEE 802.16a/IEEE 802.16e communication system has a single-cell configuration, and comprises a base station 100 and a plurality of subscriber stations 110, 120, and 130, which are controlled by the base station 100. Signal exchanges between the base station 100 and the subscriber stations 110, 120 and 130 are achieved using the OFDM/OFDMA technology.

FIG. 2 is a diagram schematically illustrating a downlink frame format for an OFDM/OFDMA broadband wireless access communication system, and in particular, illustrating a downlink frame format for an IEEE 802.16a/IEEE 802.16e communication system. Referring to FIG. 2, the downlink frame includes a preamble field 200, a broadcast control field 210, and a plurality of time division multiplexing (TDM) fields 220 and 230. A synchronization signal or a preamble sequence, for acquiring mutual synchronization between a base station and a subscriber station, are transmitted over the preamble field 200. The broadcast control field 210 includes a DL (DownLink)_MAP field 211 and a UL (UpLink)_MAP field 213. The DL_MAP field 211 is a field over which a DL_MAP message is transmitted, and information elements (IEs) included in the DL_MAP message are illustrated in Table 1 below.

TABLE 1

| Syntax | Size | Notes |
|---|---|---|
| DL-MAP_Message_Format( ) { | | |
| Management Message Type = 2 | 8 bits | |

TABLE 1-continued

| Syntax | Size | Notes |
|---|---|---|
| PHY Synchronization Field | Variable | See appropriate PHY specification. |
| DCD Count | 8 bits | |
| Base Station ID | 48 bits | |
| Number of DL-MAP Elements n | 16 bits | |
| Begin PHY Specific Section { | | See applicable PHY section. |
|   for(i = 1; i <= n; i++) { | | For each DL-MAP element 1 to n. |
|     DL_MAP_Information_Element( ) | variable | See corresponding PHY specification. |
|     if (byte boundary) { | | |
|       Padding Nibble | 4 bits | Padding to reach byte boundary. |
|     } | | |
|   } | | |
| } | | |
| } | | |

As illustrated in Table 1, IEs of the DL_MAP message include Management Message Type indicating a type of a transmission message, PHY (PHYsical) Synchronization Field established based on modulation and demodulation schemes applied to a physical channel to acquire synchronization, DCD Count indicating a count corresponding to a change in the configuration of a downlink channel descript (DCD) message containing a downlink burst profile, Base Station ID indicating a base station identifier, and Number of DL_MAP Elements n indicating the number of elements following the Base Station ID. Although not illustrated in Table 1, the DL_MAP message includes information on ranging codes allocated to corresponding rangings described below.

In addition, the UL_MAP field 213 is a field over which a UL_MAP message is transmitted, and IEs included in the UL_MAP message are illustrated in Table 2 below.

TABLE 2

| Syntax | Size |
|---|---|
| UL_MAP_Message_Format( ) { | |
|   Management Message Type = 3 | 8 bits |
|   Uplink channel ID | 8 bits |
|   UCD Count | 8 bits |
|   Number of UL_MAP Elements n | 16 bits |
|   Allocation Start Time | 32 bits |
|   Begin PHY Specific Section { | |
|     for(i = 1; i < n; i + n) | |
|       UL_MAP_Information_Element { | Variable |
|         Connection ID | |
|         UIUC | |
|         Offset | |
|       } | |
|     } | |
|   } | |
| } | |

As illustrated in Table 2, IEs of the UL_MAP message include Management Message Type indicating a type of a transmission message, Uplink Channel ID indicating an uplink channel ID in use, UCD Count indicating a count corresponding to a change in the configuration of an uplink channel descript (UCD) message containing an uplink burst profile, and Number of UL_MAP Elements n indicating the number of elements following the UCD Count. The uplink channel ID is uniquely assigned by a media access control (MAC)-sublayer.

Information designating usage of an offset written in an Offset field is included in a UIUC (Uplink Interval Usage Code) field. For example, if '2' is written in the UIUC field, it indicates that a starting offset used for initial ranging is written in the Offset field. Alternatively, if '3' is written in the UIUC field, it indicates that a starting offset used for bandwidth request ranging or maintenance ranging is written in the Offset field. As described above, a starting offset used for initial ranging, bandwidth request ranging, or maintenance ranging, based on the information written in the UIUC field, is written in the Offset field. Information on a characteristic of a physical channel to be transmitted over the UIUC field is written in a UCD message.

If a subscriber station has failed to perform successful ranging, it sets a particular backoff value in order to increase a success rate at the next attempt, and makes a ranging attempt after a lapse of the backoff time. In this case, information necessary for setting the backoff value is also included in the UCD message. A configuration of the UCD message will be described in detail with reference to Table 3 below.

TABLE 3

| Syntax | Size | Notes |
|---|---|---|
| UCD-Message_Format( ) { | | |
|   Management Message Type = 0 | 8 bits | |
|   Uplink channel ID | 8 bits | |
|   Configuration Change Count | 8 bits | |
|   Mini-slot size | 8 bits | |
|   Ranging Backoff Start | 8 bits | |
|   Ranging Backoff End | 8 bits | |
|   Request Backoff Start | 8 bits | |
|   Request Backoff End | 8 bits | |
|   TLV Encoded Information for the overall channel | Variable | |
|   Begin PHY Specific Section { | | |
|     for(i = 1; i < n; i + n) | | |
|       Uplink_Burst_Descriptor | Variable | |
|     } | | |
|   } | | |
| } | | |

As illustrated in Table 3, IEs of the UCD message include Management Message Type indicating a type of a transmission message, Uplink Channel ID indicating an uplink channel ID in use, Configuration Change Count being counted in a base station, Mini-slot Size indicating the number of minislots of an uplink physical channel, Ranging Backoff Start indicating a backoff start point for initial ranging, i.e., indicating a size of an initial backoff window for initial ranging, Ranging Backoff End indicating a backoff end point for initial ranging, i.e., indicating a size of a final backoff window, Request Backoff Start indicating a backoff start point for contention data and requests, i.e., indicating a size of an initial backoff window, and Request Backoff End indicating a backoff end point for contention data and requests, i.e., indicating a size of a final backoff window. Here, the backoff value indicates a kind of waiting time during which a subscriber station should wait for the next ranging if it fails in the rangings described below A base station must transmit to a subscriber station the backoff value that is time information for which the subscriber station should wait for the next ranging if it fails in the current ranging. For example, if a value given by the Ranging Backoff Start and the Ranging Backoff End is set to '10', the subscriber station must perform the next ranging after passing an opportunity to perform $2^{10}$ (=1024) rangings by a truncated binary exponential backoff algorithm.

In addition, the TDM fields 220 and 230 correspond to time slots assigned to subscriber stations on a TDM/TDMA (Time Division Multiple Access) basis. The base station transmits broadcast information to be broadcasted to its subscriber stations over the DL_MAP field 211 of the downlink frame using a predetermined center carrier. Upon power-on, the subscriber stations monitor all frequency bandwidths previously assigned to the subscriber stations, and detect a pilot channel signal having the highest strength, i.e., the highest pilot carrier-to-interference and noise ratio (CINR). A subscriber station determines a base station that transmitted a pilot channel signal having the highest pilot CINR, as a base station to which it currently belongs, and acquires control information for controlling its uplink and downlink and information indicating an actual data transmission/reception point by analyzing a DL_MAP field 211 and a UL_MAP field 213 of a downlink frame transmitted from the base station.

FIG. 3 is a diagram schematically illustrating an uplink frame format for an OFDM/OFDMA broadband wireless access communication system, and in particular, illustrating an uplink frame format for an IEEE 802.16a/IEEE 802.16e communication system.

Before a description of FIG. 3 is given, rangings used in the IEEE 802.16a/IEEE 802.16e communication system, i.e., initial ranging, maintenance ranging (or periodic ranging), and bandwidth request ranging, will be described.

A. Initial Ranging

The initial ranging is performed after a base station request in order to acquire synchronization the base station with a subscriber station. The initial ranging is performed to set a correct time offset and control transmission power between the subscriber station and the base station. That is, the subscriber station performs the initial ranging in order to receive, upon its power-on, a DL_MAP message and a UL_MAP message/UCD message, acquire synchronization with a base station, and then control the time offset and transmission power with the base station. Because the IEEE 802.16a/IEEE 802.16e communication system employs the OFDM/OFDMA technology, the ranging procedure requires subchannels and ranging codes, and the base station assigns available ranging codes according to goals, or types, of rangings. This will be described in more detail herein below.

Ranging codes are generated by segmenting a pseudorandom noise (PN) sequence having a predetermined length of, for example, 215 bits, in a predetermined unit. Generally, two 53-bit ranging subchannels constitute one ranging channel, and ranging codes are created by segmenting a PN code over a 106-bit ranging channel. The ranging codes generated in this way can be assigned to a maximum of 48 per subscriber stations, and a minimum of 2 ranging codes per subscriber station are applied by default to rangings of the 3 goals, i.e., initial ranging, periodic ranging, and maintenance ranging. Accordingly, different ranging codes are assigned to the rangings of the 3 goals. For example, N ranging codes are allocated for initial ranging (N RCs (Ranging Codes) for initial ranging), M ranging codes are allocated for periodic ranging (M RCs for maintenance ranging), and L ranging codes are allocated for bandwidth request ranging (L RCs for BW request ranging). The allocated ranging codes are transmitted to subscriber stations through a DL_MAP message as stated above, and the subscriber stations perform their ranging procedures by using the ranging codes included in the DL_MAP message according to their goals.

B. Periodic Ranging

The periodic ranging is periodically performed in order for a subscriber station to control a channel condition to a base station after controlling a time offset and transmission power with the base station through the initial ranging. The subscriber station performs the periodic ranging by using the ranging codes allocated for periodic ranging.

C. Bandwidth Request Ranging

The bandwidth request ranging is performed when a subscriber station requests allocation of a bandwidth in order to perform actual communication with a base station, after controlling a time offset and transmission power with the base station through the initial ranging. The bandwidth request ranging can be performed using a selected one of the following three methods: Grants, Contention-based Focused bandwidth requests for Wireless MAN-OFDM, and Contention-based CDMA bandwidth requests for Wireless MAN-OFDMA. A detailed description of the three methods will now be made herein below.

(1) Grants

The Grants method requests assignment of a bandwidth when a communication system to which a subscriber station currently belongs is a single-carrier communication system. In this method, a subscriber station performs the bandwidth request ranging, using a default CID (Connection ID) rather than its own CID. If the subscriber station fails in the bandwidth request ranging, it reattempts the bandwidth request ranging after a backoff value previously determined according to the last information received from a base station and a request status of the base station, or determines to discard a received service data unit (SDU). Herein, the subscriber station has already detected the backoff value through a UCD message.

(2) Contention-Based Focused Bandwidth Requests for Wireless MAN-OFDM

The Contention-based Focused bandwidth requests for Wireless MAN-OFDM method requests assignment of a bandwidth when a communication system to which a subscriber station currently belongs is an OFDM communication system. The Contention-based Focused bandwidth requests for Wireless MAN-OFDM method is classified again into two methods. A first method performs the bandwidth request ranging by transmitting a Focused Contention Transmission message while a subscriber station uses a default CID as described in the Grants method. A second method performs the bandwidth request ranging by transmitting a broadcast CID rather than the default CID along with an OFDM Focused Contention ID. When the bandwidth request ranging is performed by transmitting the broadcast CID together with the OFDM Focused Contention ID, a base station determines a specific contention channel and a data rate for a subscriber station.

(3) Contention-Based CDMA Bandwidth Requests for Wireless MAN-OFDMA

The Contention-based CDMA bandwidth requests for Wireless MAN-OFDMA method requests allocation of a bandwidth when a communication system to which a subscriber station currently belongs is an OFDMA communication system. The Contention-based CDMA bandwidth requests for Wireless MAN-OFDMA method is classified again into two methods. A first method performs the bandwidth request ranging as described in the Grants method, and a second method performs the bandwidth request ranging by using a CDMA (Code Division Multiple Access)-based mechanism. In the second method using the CDMA-based mechanism, the communication system uses a plurality of tones comprised of OFDM symbols, i.e., uses a plurality of subchannels. Therefore, when a subscriber station performs bandwidth request ranging, a base station applies the CDMA-based mechanism to each of the subchannels. As a result, if the base station successfully receives the bandwidth request ranging, a subscriber station that performed the bandwidth request ranging through a MAC protocol data unit (PDU) allocates a frequency bandwidth. In a REQ (REQuest) Region-Focused method, if a plurality of subscriber stations attempt bandwidth request ranging through the same subchannel using the same contention code, collision possibility is increased undesirably.

Referring to FIG. 3, the downlink frame includes an Initial Maintenance Opportunities field 300 for initial ranging and maintenance ranging (or periodical ranging), a Request Contention Opportunities field 310 for bandwidth request ranging, and SS scheduled data fields 320 containing uplink data of subscriber stations. The Initial Maintenance Opportunities field 300 has a plurality of access burst periods including actual initial ranging and periodic ranging, and a collision period in case that collision occurs between the access burst periods. The Request Contention Opportunities field 310 has a plurality of bandwidth request periods including actual bandwidth request ranging, and a collision period in case that collision occurs between the bandwidth request periods. Each of the SS scheduled data fields 320 is comprised of a plurality of SS schedule data fields (SS #1 scheduled data field to SS #N scheduled data field). Subscriber station transition gaps (SS transition gap) are located between the SS scheduled data fields (SS #1 scheduled data field to SS #N scheduled data field).

FIG. 4 is a diagram schematically illustrating a procedure for performing communication through the messages illustrated in FIGS. 2 and 3 in a broadband wireless access communication system. Referring to FIG. 4, upon a power-on, a subscriber station 400 monitors all previously assigned frequency bandwidths, and detects a pilot channel signal having the highest strength, i.e., the highest pilot CINR. The subscriber station 400 determines a base station 420 that transmitted a pilot channel signal having the highest pilot CINR, as a base station to which it currently belongs, and acquires system synchronization with the base station 420 by receiving a preamble of a downlink frame transmitted from the base station 420.

If system synchronization is acquired between the subscriber station 400 and the base station 420 in this way, the base station 420 transmits a DL_MAP message and a UL_MAP message to the subscriber station 400 (Steps 411 and 413). The DL_MAP message, as described in connection with Table 1, transmits, to the subscriber station 400, information necessary for acquiring synchronization with the base station 420 by the subscriber station 400 in a downlink and information on a structure of a physical channel capable of receiving, through the synchronization, messages transmitted to the subscriber stations 400 in the downlink. The UL_MAP message, as described in connection with Table 2, transmits, to the subscriber station 400, information on a scheduling period of the subscriber station and a structure of a physical channel.

The DL_MAP message is periodically transmitted from a base station to all subscriber stations, and when a subscriber station can continuously receive the message, it is said that the subscriber station is synchronized with the base station. That is, subscriber stations that succeeded in receiving the DL_MAP message can receive all messages transmitted through a downlink.

As descried in conjunction with Table 3, when a subscriber station fails in access, a base station transmits to the subscriber station the UCD message containing information representing an available backoff value.

However, when performing the ranging, the subscriber station 400 transmits an RNG_REQ message to the base station 420 (Step 415). Upon receiving the RNG_REQ message, the base station 420 transmits to the subscriber station 400 an RNG_RSP message containing the above-stated information for correcting frequency, time, and transmission power (Step 417).

A configuration of the RNG_REQ message is illustrated in Table 4 below.

TABLE 4

| Syntax | Size | Notes |
| --- | --- | --- |
| RNG-REQ_Message_Format( ) { | | |
| Management Message Type = 4 | 8 bits | |
| Downlink Channel ID | 8 bits | |
| Pending Until Complete | 8 bits | |
| TLV Encoded Information | Variable | TLV specific |
| } | | |

In Table 4, Downlink Channel ID represents a downlink channel ID for a channel that the subscriber station received from the base station, and Pending until Complete represents priority of a transmission ranging response. For example, Pending until Complete=0 indicates that a previous ranging response has priority over other ranging responses, while Pending until Complete≠0 indicates that a currently-transmitted ranging response has priority over other ranging responses.

In addition, a configuration of the RNG_RSP message responsive to the RNG_REQ message of Table 4 is illustrated in Table 5 below.

TABLE 5

| Syntax | Size | Notes |
| --- | --- | --- |
| RNG-REQ_Message_Format( ) { | | |
| Management Message Type = 5 | 8 bits | |
| Uplink Channel ID | 8 bits | |
| TLV Encoded Information | Variable | TLV specific |
| } | | |

In Table 5, Uplink Channel ID represents an uplink channel ID for an RNG_REQ message that the base station received.

The OFDMA communication system proposed in an IEEE 802.16a may replace the RNG_REQ message by using a method of designating a dedicated ranging period to more efficiently perform the ranging and transmitting ranging codes for the dedicated period. A communication procedure in the OFDMA broadband wireless access communication system is illustrated in FIG. 5.

Referring to FIG. 5, a base station 520 transmits a DL_MAP message and a UL_MAP message to the subscriber station 500 (Steps 511 and 513), and details thereof are equal to those described in connection with FIG. 4.

Further, as described above, in the OFDMA communication system, a ranging code is transmitted instead of the RNG_REQ message used in FIG. 4 (Step 515), and upon receiving the ranging code, the base station 520 transmits an RNG_RSP message to the subscriber station 500 (Step 517).

However, new information must be added for writing information responsive to the ranging code transmitted to the base station in the RNG_RSP message. The new information that must be added to the RNG_RSP message includes:

1. Ranging Code: received ranging CDMA code;
2. Ranging Symbol: OFDM symbol in the received ranging CDMA code;
3. Ranging subchannel: ranging subchannel in the received ranging CDMA code; and
4. Ranging frame number: frame number in the received ranging CDMA code.

As descried above, the IEEE 802.16a communication system does not take mobility of a subscriber station into consideration, i.e., it considers that the subscriber station is located in a fixed position, and considers only a single-cell configuration. However, as described above, it is provided that the IEEE 802.16e communication system considers mobility of a subscriber station in addition to characteristics of the IEEE 802.16a communication system. Therefore, the IEEE 802.16e communication system must consider mobility of a subscriber station in a multi-cell environment. In order to provide mobility of a subscriber station in the multi-cell environment, modification of operations of the subscriber station and the base station is necessary. However, the IEEE 802.16e communication system has proposed no specification for the multi-cell environment and the mobility of a subscriber station. Therefore, in order to support the mobility of a subscriber station, the IEEE 802.16e communication system requires a method for performing a handover taking an idle state and also a communication state into consideration.

SUMMARY OF THE INVENTION

It is, therefore, an object of the present invention to provide a system and method for performing efficient data communication while guaranteeing mobility of a subscriber station in a broadband wireless access communication system.

It is another object of the present invention to provide a system and method for performing a handover between base stations to secure mobility of a subscriber station in a broadband wireless access communication system.

It is further another object of the present invention to provide a system and method for receiving, at a handover request of a serving base station, a handover request message containing handover-related information from a subscriber station, determining a target base station to which the subscriber station can be handed over from the serving base station in communication, and transmitting the determined result to the subscriber station.

In accordance with one aspect of the present invention, there is provided a method for performing a handover by a subscriber station at a request of a serving base station in a broadband wireless access communication system including the serving base station for providing a service to the subscriber station through at least one frequency bandwidth obtained by dividing an entire frequency bandwidth comprised of a plurality of subcarriers, and a plurality of neighbor base stations being adjacent to the serving base station. The method comprises the steps of: receiving information on the neighbor base stations from the serving base station; measuring carrier-to-interference and noise ratios (CINRs) of frequency bandwidth signals from the neighbor base stations based on the information on the neighbor base stations; receiving a handover scan request message from the serving base station; transmitting to the serving base station a handover request message containing information on the measured CINRs of the neighbor base stations; receiving, from the serving base station, information on at least one target base station capable of supporting handover of the subscriber station among the neighbor base stations; and performing handover from the serving base station to one of the at least one target base stations.

In accordance with another aspect of the present invention, there is provided a method for performing a handover by a serving base station in a broadband wireless access communication system including the serving base station providing a service to a subscriber station through at least one frequency bandwidth obtained by dividing an entire frequency bandwidth comprised of a plurality of subcarriers, and a plurality of neighbor base stations being adjacent to the serving base station. The method comprises the steps of: transmitting a handover scan request message to the subscriber station, if a handover of the subscriber station is required; receiving carrier-to-interference and noise ratios (CINRs) of the neighbor base stations from the subscriber station in response to the handover scan request message, and sorting the neighbor base stations in order of CINR levels; sequentially sending a handover connection request to the neighbor base stations in order of CINR levels; and transmitting information on a particular neighbor base station to the subscriber station upon receiving a handover connection response with ACK (Acknowledgement) information from the particular neighbor base station in response to the handover connection request.

In accordance with further another aspect of the present invention, there is provided a broadband wireless access communication system comprising: a subscriber station for sending a serving base station a request for handover to at least one neighbor base station having a carrier-to-interference and noise ratio (CINR) satisfying a handover condition, in response to a handover scan request message, and performing handover to a particular neighbor base station that transmits a handover response in response to the handover request; the serving base station currently in communication with the subscriber station, for transmitting the handover scan request message to the subscriber station if handover of the subscriber station is required, sending a handover connection request to neighbor base stations in order of levels of CINRs reported from the subscriber station, and sending the subscribe station information on a particular neighbor base station upon receiving a handover connection response with ACK information from the particular neighbor base station; and the particular neighbor base station for determining whether it can support handover of the subscriber station, in response to the handover connection request, and sending the handover connection response with ACK information to the serving base station if it can support handover of the subscriber station.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail herein below with reference to the annexed drawings. In the following description, a detailed description of known functions and configurations incorporated herein has been omitted for conciseness.

Figure 6:
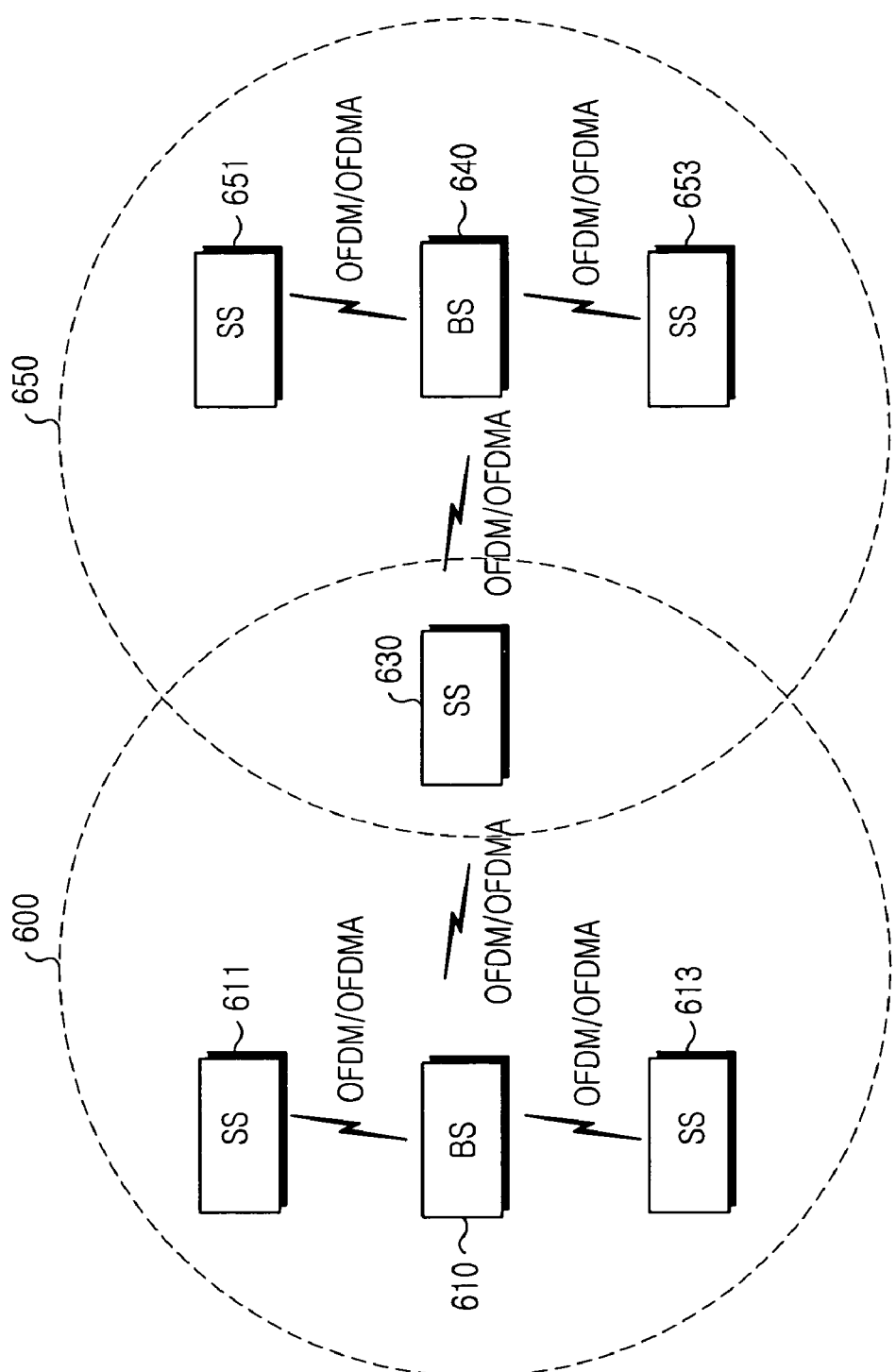
FIG. 6 is a diagram schematically illustrating a configuration of an OFDM/OFDMA broadband wireless access communication system according to an embodiment of the present invention.

FIG. 6 is a diagram schematically illustrating a configuration of an OFDM/OFDMA broadband wireless access communication system according to an embodiment of the present invention. Before a description of FIG. 6 is given, it should be noted that as stated in the related art section, unlike the IEEE 802.16a communication system, an IEEE 802.16e communication system considers the mobility of a subscriber station (SS), but no specification has been proposed for this communication system. In order to consider the mobility of a subscriber station in addition to characteristics of the IEEE 802.16a communication system, the IEEE 802.16e communication system can consider a multi-cell configuration and handover of a subscriber station between multiple cells. Therefore, the present invention proposes a configuration of an IEEE 802.16e communication system illustrated in FIG. 6. The IEEE 802.16e communication system is a broadband wireless access (BWA) communication system employing Orthogonal Frequency Division Multiplexing (OFDM) and Orthogonal Frequency Division Multiple Access (OFDMA) (hereinafter, referred to as "OFDM/OFDMA broadband wireless access communication system"), and for the convenience of explanation, the description will be made with reference to the IEEE 802.16e communication system.

Referring to FIG. 6, the IEEE 802.16e communication system has a multi-cell configuration, and is comprised of a cell 600, a cell 650, a base station 610 for controlling the cell 600, a base station 640 for controlling the cell 650, and a plurality of subscriber stations 611, 613, 630, 651, and 653. Signal exchange between the base stations 610 and 640 and their associated subscriber stations 611, 613, 630, 651, and 653 is achieved using the OFDM/OFDMA technology Among the subscriber stations 611, 613, 630, 651, and 653, the subscriber station 630 is located in a boundary region, or a handover region, between the cell 600 and the cell 650. Therefore, it is necessary to support a handover of the subscriber station 630 in order to support mobility of the subscriber station 630.

In a broadband wireless access communication system, a subscriber station receives pilot channels transmitted from a plurality of base stations. The subscriber station measures carrier-to-interference and noise ratios (CINRs) of the received pilot channels. As a result of the measurement results, the subscriber station selects a base station having the highest CINR among the measured CINRs. That is, the subscriber station detects a base station to which it belongs, by selecting a base station having the best channel condition among a plurality of base stations transmitting the pilot channels. Herein, a base station having the best channel condition with respect to the subscriber station will be referred to as an "active base station" or a "serving base station."

After selecting the active base station, the subscriber station receives a downlink frame and an uplink frame transmitted from the active base station. Formats of the uplink frame and the downlink frame transmitted from the active base station are similar to the frame formats descried in the related art section. Table 6 below illustrates a message to be added for the present invention in addition to the DL_MAP message shown in Table 1.

TABLE 6

| MAC management message | Parameter | Multi | Content |
|---|---|---|---|
| DL_MAP | Neighbor list BS Num | common | Number of Neighbor list BSs |
| | Neighbor list Info | 1 to Neighbor list BS Num | |
| | Neighbor list BS ID | | IDs of Neighbor list BSs |
| | Neighbor Frequency | | Frequencies of Neighbor BSs |
| | Neighbor Frequency offset | | Frequency offsets of Neighbor BSs |
| | Neighbor Frame offset | | Frame offsets of Neighbor BSs |
| | Measurement Info | common | |
| | Pilot min CINR | | Minimum CINR available for Neighbor list |
| | MAX_T | | Maximum time for which BSs included |

TABLE 6-continued

| MAC management message | Parameter | Multi | Content |
|---|---|---|---|
| | MIN_T | | in Neighbor list remain below pilot min CINR Minimum time for which BS having the highest pilot CINR among BSs in the Neighbor list remains at a value higher than pilot CINR of active BS |
| | Measurement mode | common | Method of measuring pilot CINR (on a periodical basis or an event basis) |
| Periodic report | | | |
| | report period | | Periodic for which measured pilot CINR is reported to active BS |
| Event trigger report | | | |
| | event a | | When there is BS having higher pilot CINR than that of active BS among BSs in Neighbor list, SS transmits handover request message to active BS |
| | event b | | When active BS transmits handover scan request message to SS, SS transmits handover request message to active BS |
| | Measurement command | common | Determine whether to set, reset or release method of measuring pilot CINR |
| | Measurement configuration | common | |
| | measurement start frame | | Frame where pilot CINR measurement is started |
| | measurement periodic | | Period for which pilot CINR is measured |

It can be understood from Table 6 that the active base station transmits the DL_MAP message along with information on neighbor base stations. The "neighbor base station" refers to a base station to which a subscriber station can be handed over from the active base station. A parameter MAX_T represents a maximum time for which CINRs measured by the subscriber station using pilot channels received from the neighbor base stations remain below a threshold set by a subscriber. The MAX_T is set in order for the subscriber station to measure CINRs of pilot signals received from the neighbor base stations and determine whether there are neighbor base stations of which CINRs remain below the threshold for the set time. As a result of the determination, the neighbor base stations with CINRs lower than the threshold suspend CINR measurement even though they are included in the neighbor base station list. This excludes an unnecessary operation of measuring CINRs of the neighbor base stations whose CINRs are lower than the threshold. However, the neighbor base stations for which CINR measurement is suspended can be newly included in the neighbor base station list at a user's option. That is, when the time set by the subscriber has passed, the subscriber station again performs CINR measurement for the neighbor base stations with CINRs lower than the threshold.

A parameter MIN_T represents a minimum time for which a CINR of a neighbor base station is higher than CINR of the active base station when the subscriber station sends a handover request message to the neighbor base station. The MIN_T is set in order to prevent a ping-pong phenomenon in which the subscriber station sends a handover request to the base station each time a CINR of a received pilot channel is higher than a CINR of the active base station. The MAX_T and the MIN_T can be changed according to conditions of the base stations and channel conditions.

A parameter Measurement mode represents a method of measuring a pilot CINR of the neighbor base station and reporting the measured pilot CINR to the active base station on a periodical basis or an event basis. When the measured pilot CINR is reported on a periodic basis, a value of a parameter 'report period' is set. When the measured pilot CINR is reported on an event basis, possible events are divided into an 'event a', where the subscriber station requests handover, and an 'event b', where the active base station requests handover. In a mode where the report is made on an event basis, the subscriber station requests handover when the measured pilot CINR of the neighbor base station is higher than a CINR of the active base station, while the active base station requests handover when the active base station transmits a handover scan request message to the subscriber station.

A parameter Measurement command represents information based on which the subscriber station newly determines whether to set, reset or release information on a method of measuring a pilot CINR of the neighbor base station. Every frame, the active base station can command the subscriber station to set, reset, or release a new measurement method through a DL_MAP message.

A parameter Measurement configuration represents information on a method of measuring a pilot CINR of the neighbor base station by the subscriber station. The parameter Measurement configuration includes information on a measurement start frame where the subscriber station should measure a pilot CINR of the neighbor base station, and information on measurement period for which the subscriber station performs the measurement. Based on this information, the subscriber station must periodically measure a pilot CINR of the neighbor base station.

A process in which the subscriber station sends a ranging request to the active base station upon receiving the DL_MAP message and the UL_MAP message, and a process in which the active base station transmits a ranging response message to the ranging-requesting subscriber station, are equivalent to the corresponding processes described above. Therefore, these processes will not be described again herein. Upon receiving the ranging response message, the subscriber station performs wireless access communication with the active base station.

Figure 7:
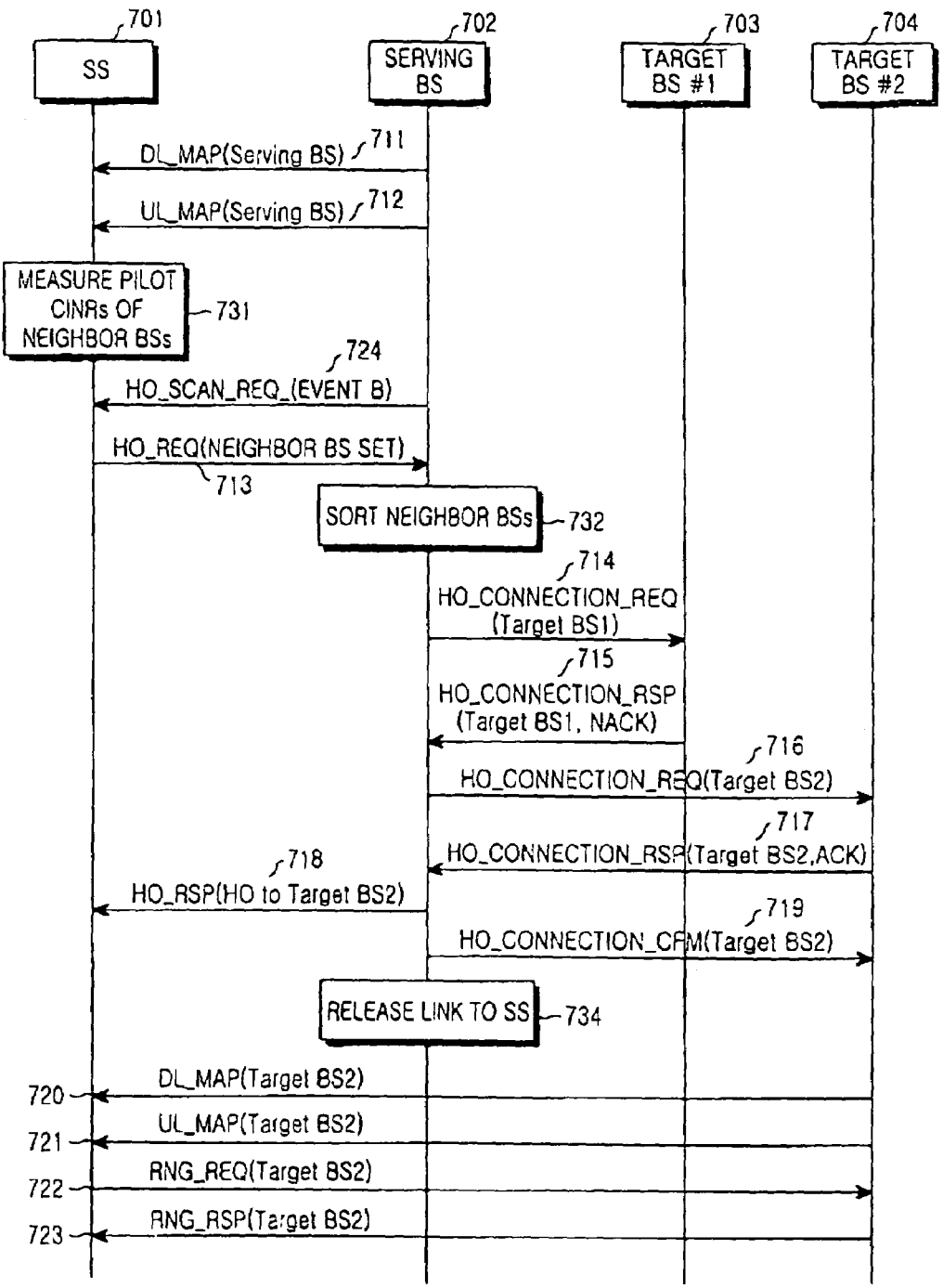
FIG. 7 is a diagram illustrating a procedure for determining a handover by a serving base station at a handover request of the serving base station in an OFDM broadband wireless access communication system according to a first embodiment of the present invention.

With reference to FIG. 7, a description will now be made of a handover process during wireless access communication between the subscriber station and the active base station when the active base station sends a handover scan request to the subscriber station. More specifically, FIG. 7 is a diagram illustrating a procedure for determining a handover by an active base station at a handover request of the active base station in a broadband wireless access communication system according to a first embodiment of the present invention, wherein the active base station sends a handover scan request to a subscriber station, and the subscriber station then transmits a handover request containing a measured pilot CINR to the active base station.

In FIG. 7, the OFDM broadband wireless access communication system includes a subscriber station 701, a serving base station 702, and target base stations 703 and 704. A description will now be made of i) a process in which the subscriber station 701 measures pilot signals from neighbor base stations, ii) a process in which the serving base station 702 sends a handover scan request to the subscriber station 701, iii) a process in which the serving base station 702 determines a target base station to which the subscriber station 701 will be handed over in response to a handover request from the subscriber station 701, and iv) a process of setting up ranging between the target base station and the subscriber station 701. A description will first be made of a process in which the subscriber station 701 measures pilot signals from neighbor base stations.

In steps 711 and 712, the subscriber station 701 receives a DL_MAP message and a UL_MAP message from the serving base station 702. The detailed configurations of the DL_MAP message and the UL_MAP message have been described with reference to Table 2 and Table 6. The DL_MAP message is transmitted to the subscriber station 701 along with the information shown in Table 6. The subscriber station 701 receives the DL_MAP message and manages a neighbor base station list transmitted from the serving base station 702. In step 731, the subscriber station 701 measures CINRs of pilot signals received from the neighbor base stations using the neighbor base station list transmitted from the serving base station 702.

The process in which the subscriber station 701 measures CINRs of pilot signals received from the neighbor base stations is achieved by suspending by the subscriber station 701 reception of data transmitted from the serving base station 702. That is, the subscriber station 701 suspends reception of data transmitted from the serving base station 702 and measures CINRs of pilot signals received from the neighbor base stations for the suspended time. In this case, it is preferable to measure only CINRs of pilot signals received from neighbor base stations not excluded by the MIN_T value, rather than measuring CINRs of pilot signals received from all neighbor base stations included in the neighbor base station list.

When the serving base station 702 desires that another base station should process a call of the subscriber station 701, the serving base station 702 sends a handover scan request message to the subscriber station 701 in step 724. A configuration of the handover scan request message transmitted from the serving base station 702 to the subscriber station 701 is illustrated in Table 7 below.

TABLE 7

| MAC management message | Parameter | Multi | Content |
| --- | --- | --- | --- |
| HO_SCAN_REQ | Measurement IE | common | Measurement method requested by active BS |
| | Activation time | common | Maximum frame time for which active BS desires to perform handover |

As illustrated in Table 7, the serving base station 702 sends the subscriber station 701 the handover scan request message containing Measurement IE and Activation time. The Measurement IE indicates a measurement and report method requested by the serving base station 702. The Activation time indicates a maximum frame time for which the serving base station 702 desires to perform handover. When sending the handover scan request to the subscriber station 701, the 'event b' is set as defined in Table 6.

In step 713, the subscriber station 701 sends a handover request message to message to the serving base station 702. An example of the handover request message transmitted from the subscriber station 701 to the serving base station 702 is illustrated in Table 8 below.

TABLE 8

| MAC management message | Parameter | Multi | Content |
| --- | --- | --- | --- |
| HO_REQ | Uplink Channel ID | common | Uplink channel ID included in message |
| | Neighbor list BS carrier frequency | 1 to Neighbor list BS Num | Carrier frequency of neighbor BS |
| | CINR of neighbor list BS | | Pilot CINRs of Neighbor list BSs |
| | QoS | Common | Service type desired by SS |
| | BW request | Common | BW desired by SS |

As illustrated in Table 8, the subscriber station 701 sends the serving base station 702 carrier frequencies of neighbor base stations included in the neighbor base station list and the measured CINRs. In addition, the subscriber station 701 informs the serving base station 702 of a channel of the subscriber station 701 located in the handover region by transmitting an identifier (ID) of an uplink channel over which it exchanges data with the serving base station 702. Moreover, the subscriber station 701 designates a desired quality of service (QoS) and a desired bandwidth (BW). The QoS can be classified into Unsolicited Grant Service (UGS), Real-Time Polling Service (rtPS), Non-Real-Time Polling Service (nrtPS), and Best Effort Service (BE).

A description will now be made of a process in which the serving base station 702 determines a target base station in response to the handover request from the subscriber station 701. Upon receiving the handover request message from the subscriber station 701, the serving base station 702 sorts neighbor base stations included in the handover request message in step 732. There are several possible methods for sorting the neighbor base stations, and in the embodiment of the present invention, the neighbor base stations are sorted in order of their CINR level, by way of example. Of course, the neighbor base stations can be sorted in other methods. CINRs of neighbor base stations, CINR measurement for which is suspended by the subscriber station 701, have a value of '0'. The serving base station 702 can store information on the sorted neighbor base stations in a list.

After sorting the neighbor base stations depending on CINR information included in the received handover request message, the serving base station 702 sequentially transmits a handover connection request message to the neighbor base stations in sorted order. In step 714, the serving base station 702 transmits the handover connection request message to a first target base station 703 having the highest CINR. An example of the handover connection request message is illustrated in Table 9 below.

TABLE 9

| MAC management message | Parameter | Multi | Content |
|---|---|---|---|
| HO_CONNECTION_RSP | Target BS ID | Common | Target BS ID |
| | CID | Common | SS CID from serving BS |
| | QoS | Common | Service type desired by SS |
| | BW request | Common | BW desired by SS |

As illustrated in Table 9, the handover connection request message is transmitted along with the QoS and the BW desired by the subscriber station 701. Therefore, the serving base station 702 must determine whether the first target base station 703 selected for handover can meet the QoS and the BW requested by the subscriber station 701. The serving base station 702 transmits the handover connection request message along with information on the QoS and the BW, and receives a response message corresponding thereto, in order to determine whether the first target base station 703 is an available target base station.

Upon receiving the handover connection request message, the first target base station 703 transmits to the serving base station 702 a handover connection response message in response to the received handover connection request message, in step 715. An example of the handover connection response message is illustrated in Table 10 below.

TABLE 10

| MAC management message | Parameter | Multi | Content |
|---|---|---|---|
| HO_CONNECTION_REQ | Target BS ID | Common | Target BS ID |
| | CID | Common | SS CID from serving BS |
| | ACK/NACK | Common | Handover availability |

As illustrated in Table 10, the first target base station 703 determines whether it can support the QoS and the BW requested by the subscriber station 701, included in the received handover connection request message. If the first target base station 703 can support the QoS and the BW requested by the subscriber station 701, the first target base station 703 transmits the handover connection response message along with ACK (Acknowledgement) information. However, if the first target base station 703 cannot support the QoS and the BW, it transmits the handover connection response message containing NACK (Negative Acknowledgement) information. For example, in step 715, the first target base station 703 transmits the handover connection response message to the serving base station 702 along with the NACK information. That is, the first target base station 703 cannot support the QoS and the BW requested by the subscriber station 701.

Upon receiving the handover connection response message from the first target base station 703, in step 716, the serving base station 702 transmits a handover connection request message to a second target base station 704 having a second highest CINR. The handover connection request message transmitted in step 716 is identical to the handover connection request message transmitted in step 714 except that a Target BS ID included therein. Upon receiving the handover connection request message, the second target base station 704 sends a response message to the serving base station 702 in response to the received handover connection request message. That is, in step 717, the second target base station 704 delivers a handover connection response message to the serving base station 702. Similarly, the second target base station 704 determines whether it can support the QoS and the BW requested by the subscriber station 701, and then transmits a handover connection response message containing the determined result. For example, in FIG. 7, the second target base station 704 can support the QoS and the BW requested by the subscriber station 701.

Upon receiving the handover connection response message from the second target base station 704, the serving base station 702 transmits a handover response message to the subscriber station 701 in step 718. The handover response message includes information on the selected target base station and a frequency bandwidth used by the selected target base station. An example of the handover response message is illustrated in Table 11 below.

TABLE 11

| MAC management message | Parameter | Multi | Content |
|---|---|---|---|
| HO_RSP | Target BS ID | Common | Target BS ID |
| | Target BS carrier frequency | Common | Carrier frequency of Target BS |

After transmitting the handover response message to the subscriber station 701 in step 718, the serving base station 702 transmits a handover connection confirmation message to the second target base station 704 in step 719. An example of the handover connection confirmation message is illustrated in Table 12.

TABLE 12

| MAC management message | Parameter | Multi | Content |
|---|---|---|---|
| HO_CONNECTION_CFM | Target BS ID | Common | Target BS ID |
| | CID | Common | SS CID from serving BS |

After transmitting the handover connection confirmation message to the second target base station 704, the serving base station 702 releases a call connected to the subscriber station 701 in step 734.

Figure 1:
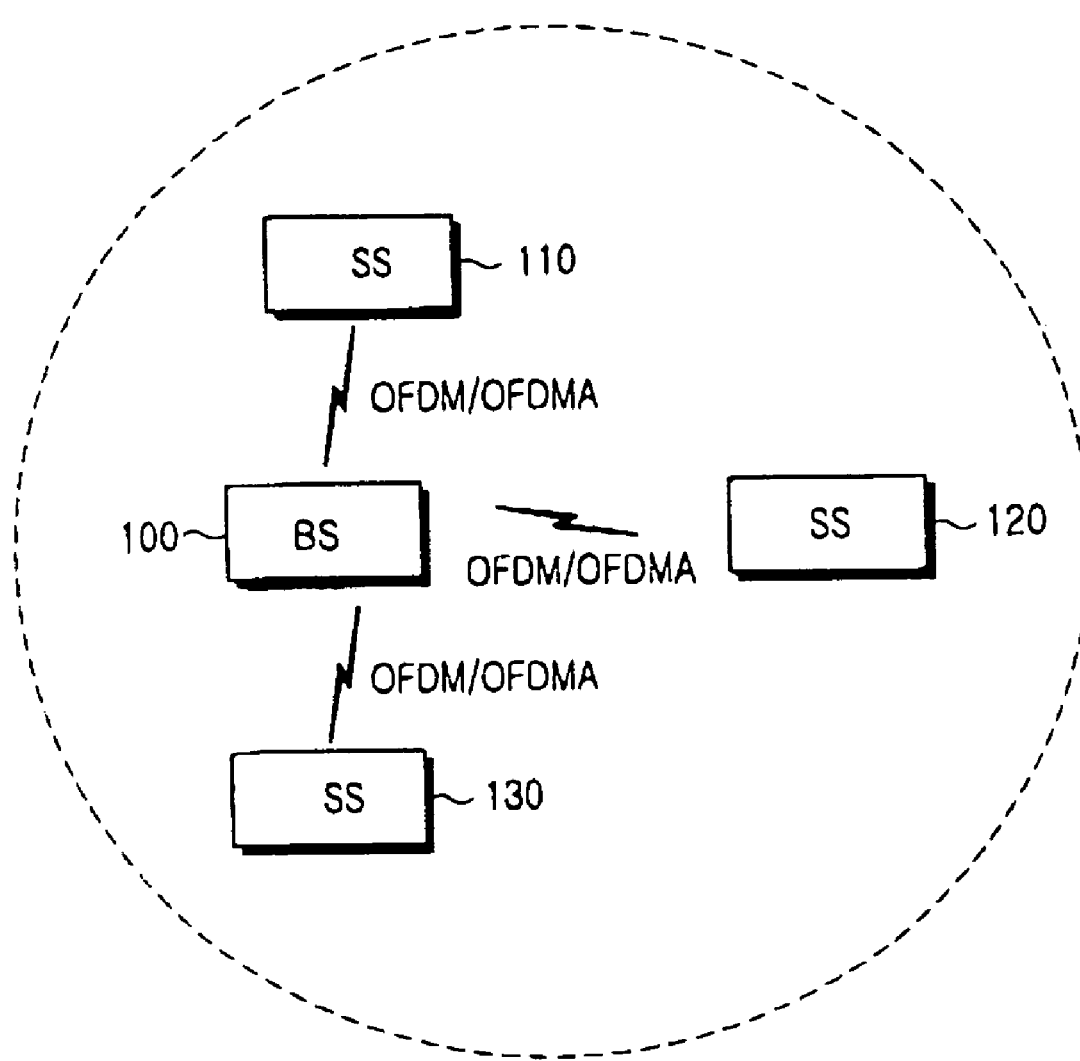
FIG. 1 is a diagram schematically illustrating a configuration of a broadband wireless access communication system employing Orthogonal Frequency Division Multiplexing (OFDM)/Orthogonal Frequency Division Multiple Access (OFDMA)
Figure 2:
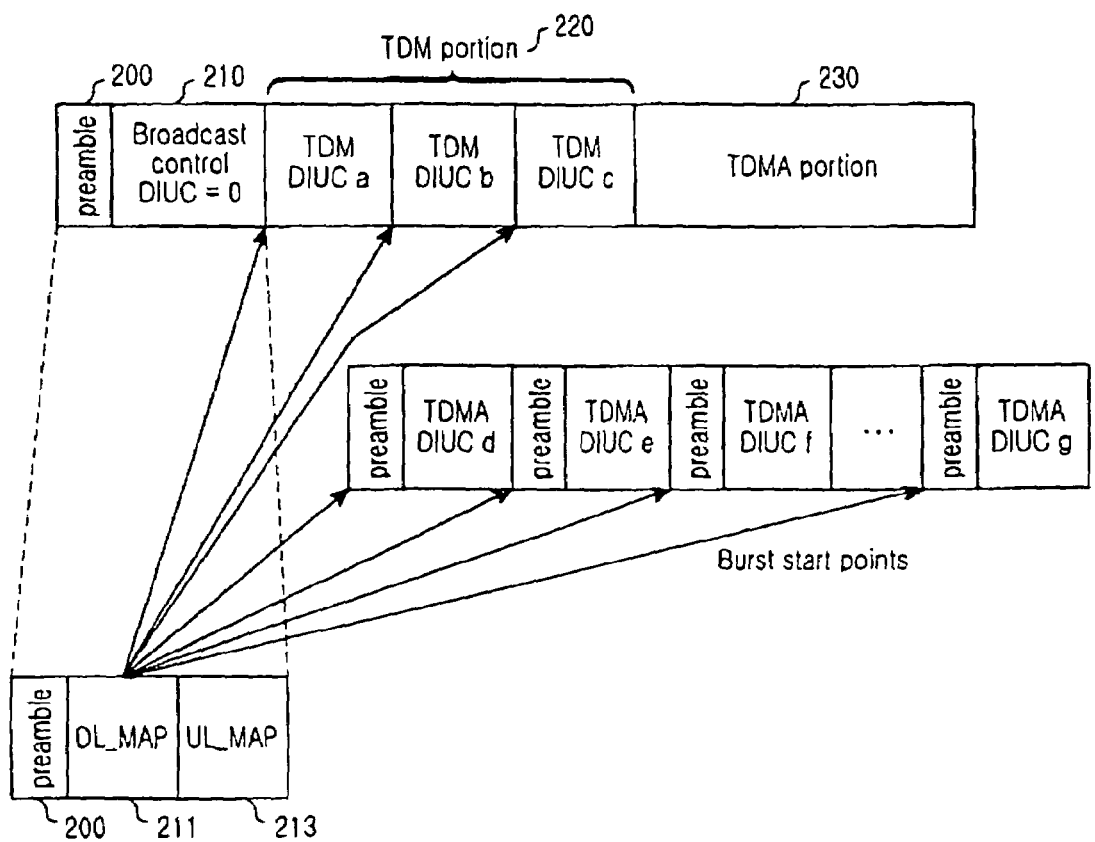
FIG. 2 is a diagram schematically illustrating a downlink frame format for an OFDM/OFDMA broadband wireless access communication system.
Figure 3:
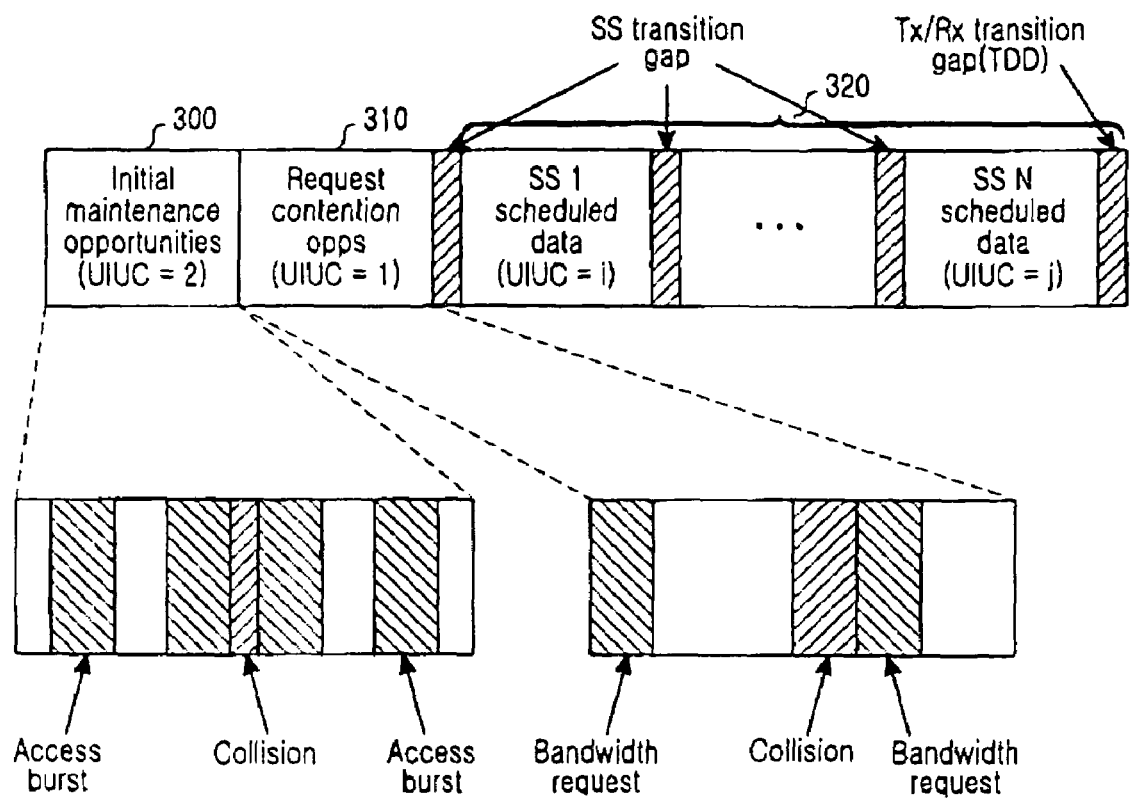
FIG. 3 is a diagram schematically illustrating an uplink frame format for an OFDM/OFDMA broadband wireless access communication system.
Figure 4:
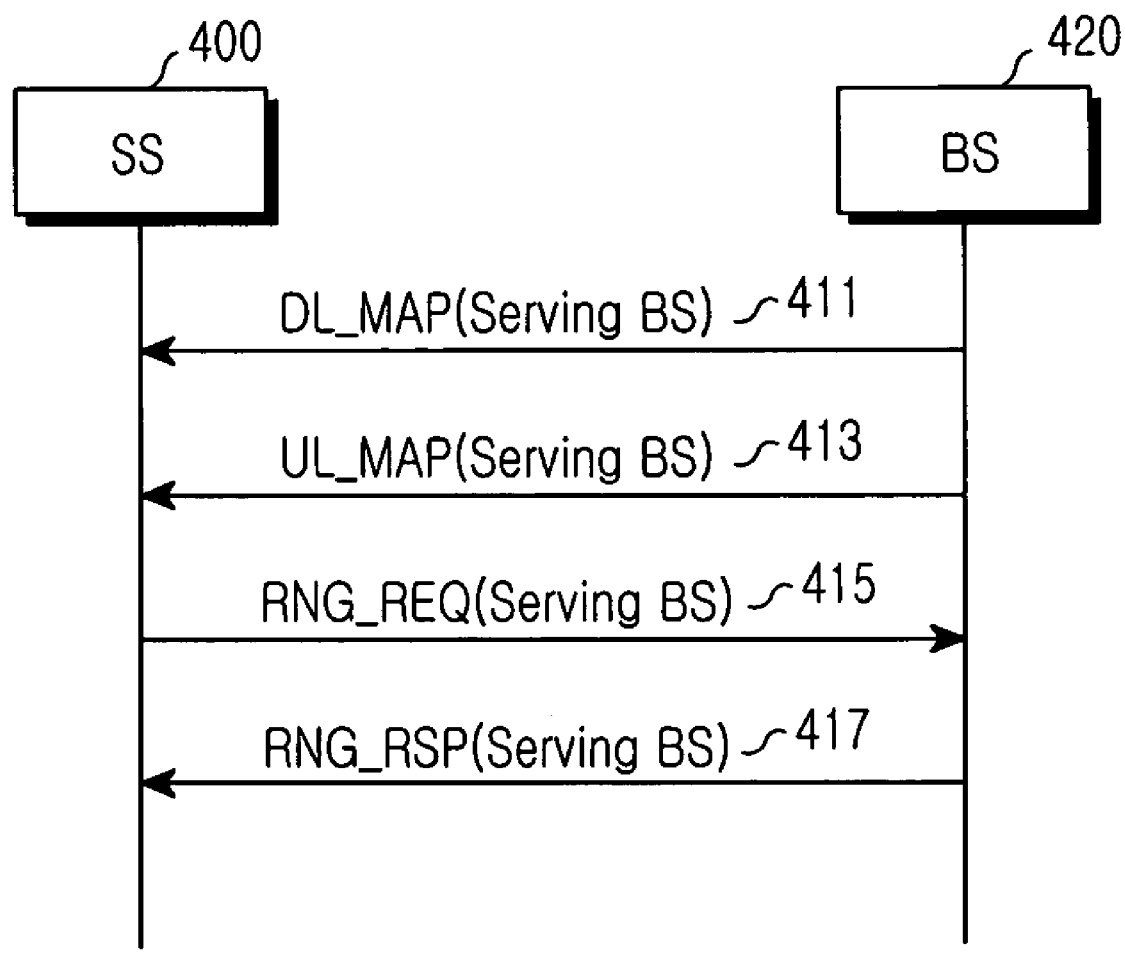
FIG. 4 is a diagram illustrating a ranging procedure between a subscriber station and a base station in an OFDM broadband wireless access communication system.

In steps 720 and 721, the second target base station 704 transmits a DL_MAP message and a UL_MAP message to the subscriber station 701. The DL_MAP message and the UL_MAP message are transmitted after information on the subscriber station 701 included therein is updated. Upon receiving the DL_MAP message and the UL_MAP message, the subscriber station 701 transmits a ranging request message to the second target base station 704 in step 722. Upon receiving the ranging request message, the second target base station 704 transmits a ranging response message to the subscriber station 701 in step 723. A detailed process performed in the steps 720 to 723 is identical to the process performed in the steps 411 to 417 illustrated in FIG. 4. Therefore, a detailed description of these step will not be given again herein.

Figure 5:
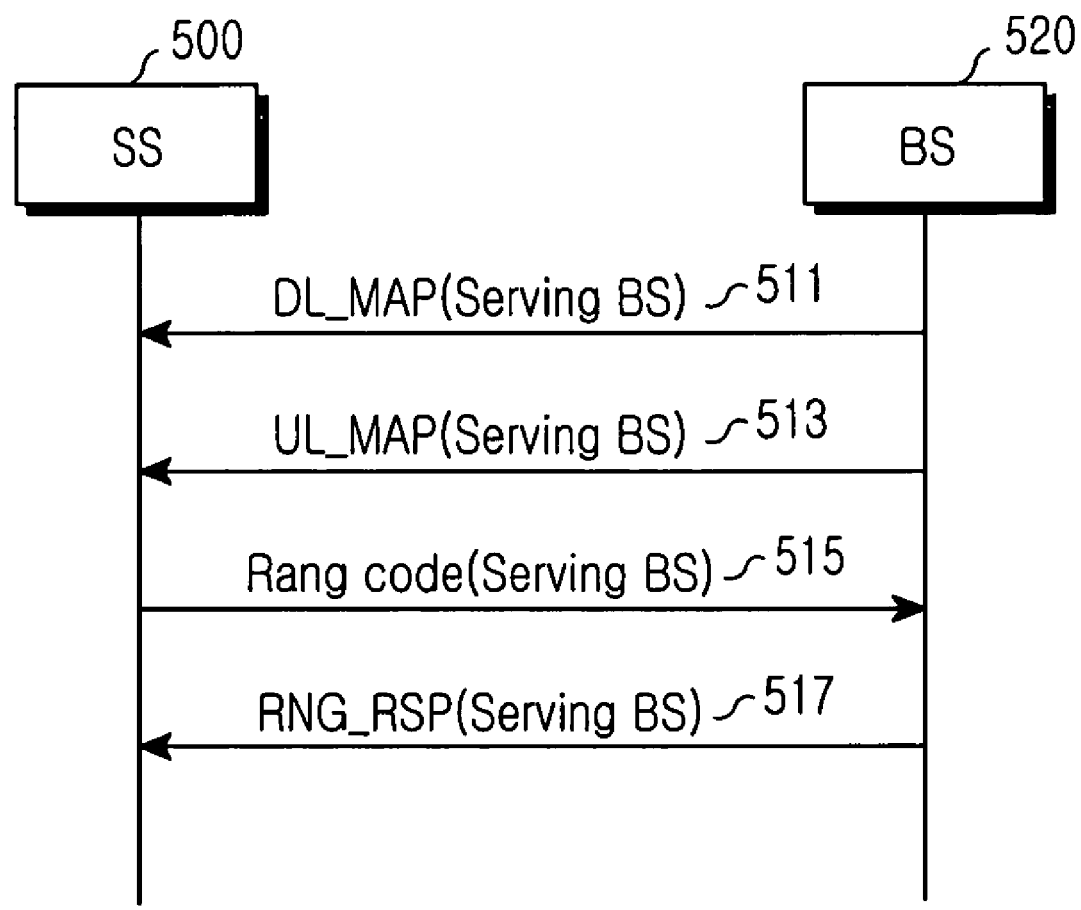
FIG. 5 is a diagram illustrating a ranging procedure between a subscriber station and a base station in an OFDMA broadband wireless access communication system.
Figure 8:
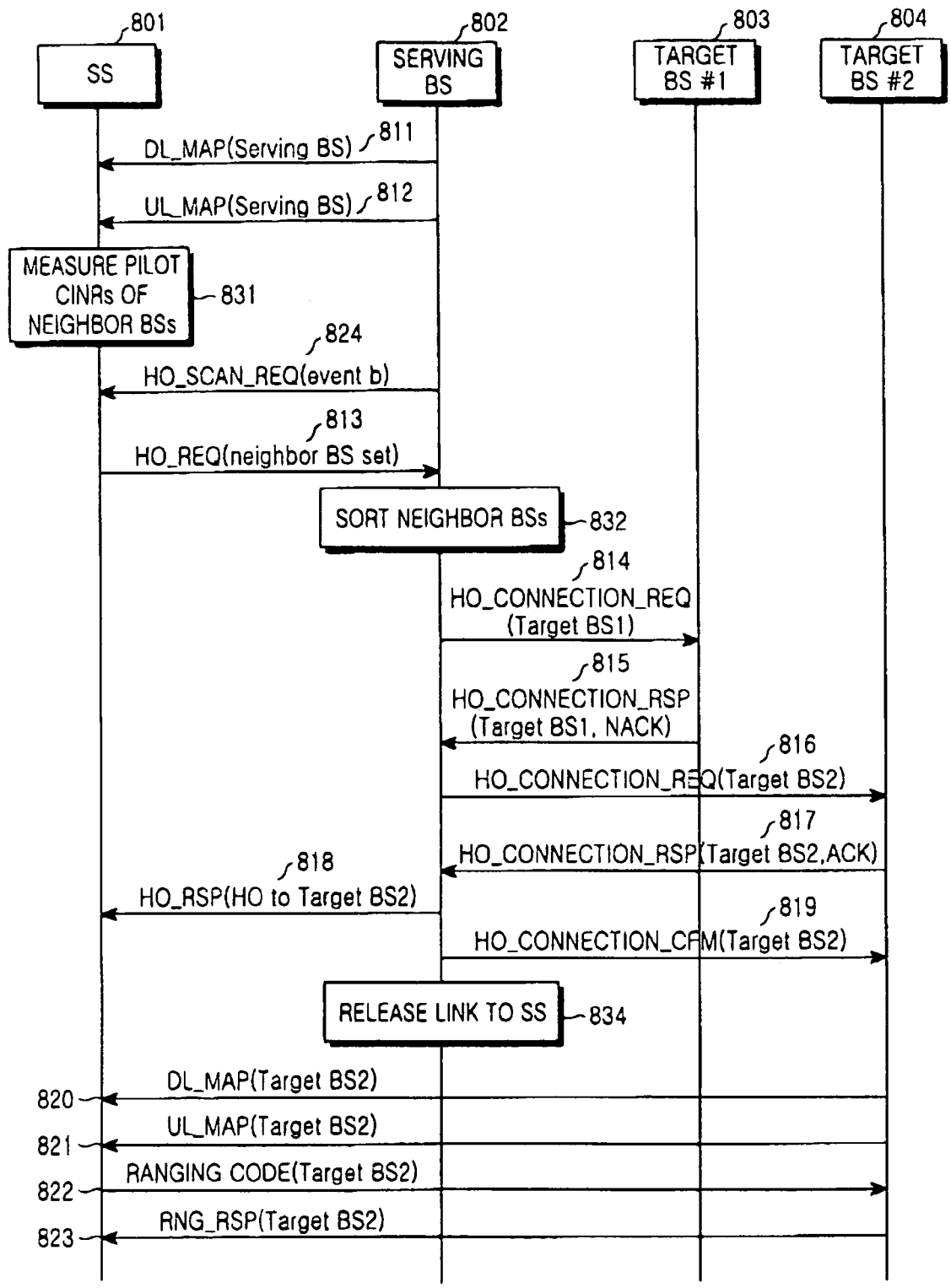
FIG. 8 is a diagram illustrating a procedure for determining a handover by a serving base station at a handover request of the serving base station in an OFDM broadband wireless access communication system according to a second embodiment of the present invention.

FIG. 8 is a diagram illustrating a procedure for determining handover by a serving base station at a handover request of the serving subscriber station in an OFDMA broadband wireless access communication system according to a second embodiment of the present invention. The elements used in FIG. 8 are identical to those in FIG. 7. In addition, steps 811 to 834 of FIG. 8 are identical in operation to the steps 711 to 734 illustrated in FIG. 7. Further, steps 820 to 823 are identical in operation to the steps 511 to 517 illustrated in FIG. 5. Therefore, a detailed description of FIG. 8 will be omitted for simplicity.

Figure 9:
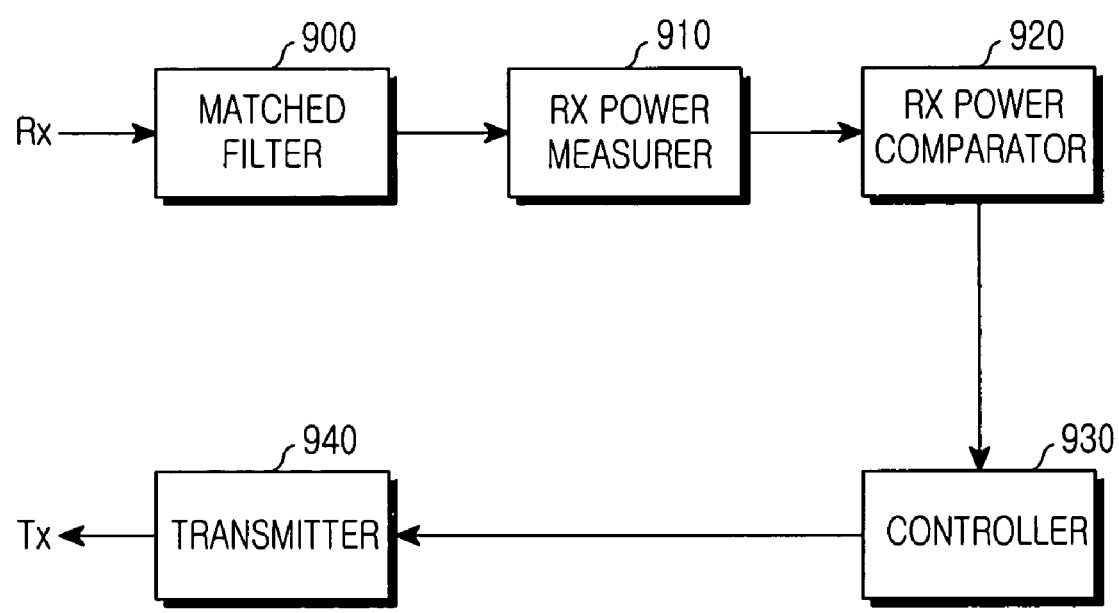
FIG. 9 is a block diagram illustrating a structure of a subscriber station according to an embodiment of the present invention.

FIG. 9 is a block diagram illustrating a subscriber station according to an embodiment of the present invention. As illustrated in FIG. 9, the subscriber station is comprised of a matched filter 900, a reception power measurer 910, a reception power comparator 920, a controller 930, and a transmitter 940. A PN code for synchronization detection received at a receiver (now shown) is applied to the matched filter 900, and the matched filter 900 outputs a specific energy value according to whether synchronization is acquired. A correlator, or a correlation detector, can be used in place of the matched filter 900. The matched filter 900 compares the received PN code for synchronization detection with a unique PN code stored in the receiver, and outputs a specific value when they are identical. That is, the matched filter 900 sequentially inputs received signals into a particular window, and bit-operates the window with the unique PN code on a parallel basis, and sums up the bit-operated values. If the received signal is identical to the unique PN code stored in the receiver, it indicates an autocorrelated state and the matched filter 900 outputs a maximum value. However, if the received signal is not identical to the unique PN code, it indicates a non-autocorrelated state and the matched filter 900 outputs a relatively low value. Generally, the output values are compared with a given threshold to determine whether autocorrelation is detected. That is, whether autocorrelation is detected or not can be determined based on the output value of the matched filter 900.

If it is determined by the matched filter 900 that a pilot channel received from a neighbor base station is autocorrelated, the reception power measurer 910 measures reception power of the received pilot channel. That is, the reception power measurer 910 measures a CINR of the received pilot channel, and delivers information on the measured CINR for the received pilot channel to the reception power comparator 920. The reception power comparator 920 compares the CINRs of neighbor base stations, provided from the reception power measurer 910, with a predetermined threshold. If one or more CINRs among the measured CINRs of the neighbor base stations are higher than the threshold, the reception power comparator 920 compares CINRs of the neighbor base stations, being higher than the threshold, with a CINR of a serving base station, to determine whether there is any CINR that is higher than the CINR of the serving base station. The reception power comparator 920 provides the determined result to the controller 930. When a handover scan request message is received from the serving base station, the controller 930 performs a control operation of transmitting a handover request message containing the determined result to the serving base station.

That is, the controller 930 of the receiver receiving the handover scan request message from the serving base station generates a handover request message and provides the generated handover request message to the transmitter 940. The transmitter 940, under the control of the controller 930, transmits the handover request message to the serving base station.

Figure 10:
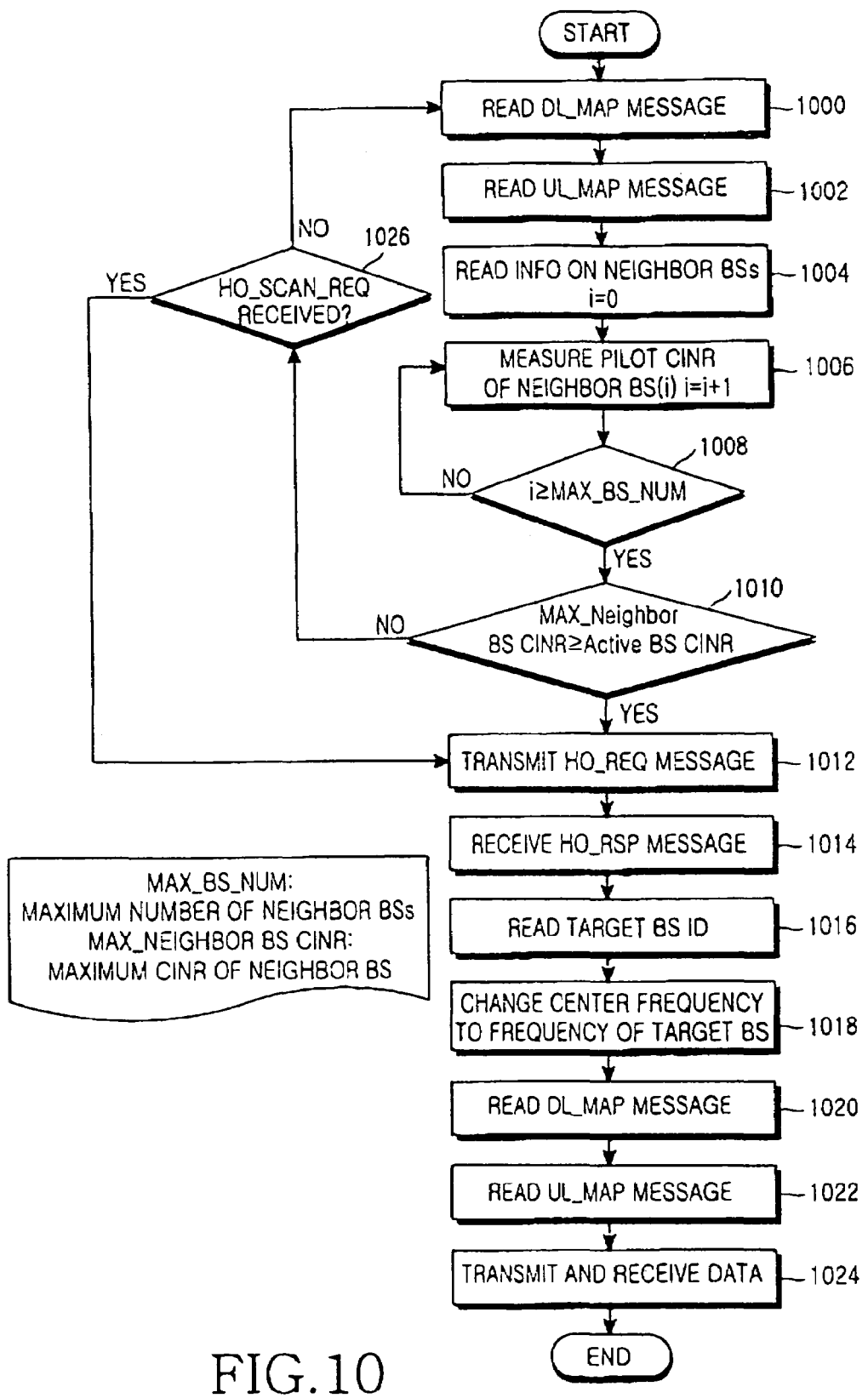
FIG. 10 is a flowchart illustrating a procedure for performing a handover by a subscriber station in response to a handover scan request from a serving base station according to an embodiment of the present invention.

FIG. 10 is a flowchart illustrating an operation of a subscriber station according to an embodiment of the present invention. In steps 1000 and 1002, the subscriber station reads a DL_MAP message and a UL_MAP message received from the serving base station. In step 1004, the subscriber station reads a neighbor base station list included in the DL_MAP message. The neighbor base station list includes information on neighbor base stations, received from the serving base station.

In step 1006, the subscriber station measures CINRs of pilot channels transmitted from the neighbor base stations. Unique numbers of the neighbor base stations, provided from the serving base station, are BS_1 to MAX_B-S_NUM. At first, the subscriber station measures in step 1006 a CINR of a neighbor base station BS_1, and then proceeds to step 1008. The subscriber station determines in step 1008 whether a unique number of the CINR-measured neighbor base station is smaller than MAX_BS_NUM. If it is determined that a unique number of the CINR-measured neighbor base station is greater than or equal to MAX_B-S_NUM, the subscriber station proceeds to step 1010. However, if a unique number of the CINR-measured neighbor base station is smaller than MAX_BS_NUM, the subscriber station returns to step 1006. In step 1006, the subscriber station increases a unique number of the neighbor base station by one, and measures a CINR of a neighbor base station having the increased unique number.

In step 1010, the subscriber station compares CINRs of the neighbor base stations with a CINR of the serving (or active) base station. Of course, before comparing CINRs of the neighbor base stations with a CINR of the serving base station, the subscriber station first compares CINRs of the neighbor base stations with a threshold. If the highest CINR among the CINRs of the neighbor base stations is lower than the CINR of the serving base station, the subscriber station determines in step 1026 whether the handover scan request message is received from the serving base station. If the serving base station requests handover, the subscriber station will receive the handover scan request message from the serving base station. However, if the handover scan request message is not received, the subscriber station returns to step 1000 to receive the DL_MAP message, which the serving base station transmits. However, if the highest CINR among the CINRs of the neighbor base stations is greater than or equal to the CINR of the serving base station, the subscriber station determines to send a handover request, and then proceeds to step 1012.

According to an embodiment of the present invention, the subscriber station can be handed over at the request of the serving base station even if it is determined in step 1010 that the highest CINR among the CINRs of the neighbor base stations is lower than the CINR of the serving base station.

Upon receiving the handover scan request message from the serving base station, the subscriber station transmits a handover request message to the serving base station in step 1012. The detailed configuration of the handover request message is illustrated in Table 6.

After transmitting the handover request message, the subscriber station receives a handover response message in step 1014. The detailed configuration of the handover response message is illustrated in Table 11. In FIG. 10, the handover response message includes ACK information for the handover requested by the subscriber station. In step 1016, the subscriber station reads an ID of a target base station and a carrier frequency used in the target base station, included in the handover response message.

In step 1018, the subscriber station changes its frequency to a frequency of the target base station. As a result, the subscriber station suspends data exchange with the serving base station and performs data exchange with the target base station. For that purpose, the subscriber station reads a DL_MAP message and a UL_MAP message transmitted from the target base station in steps 1020 and 1022, and performs the data exchange with the target base station in step 1024.

Figure 11:
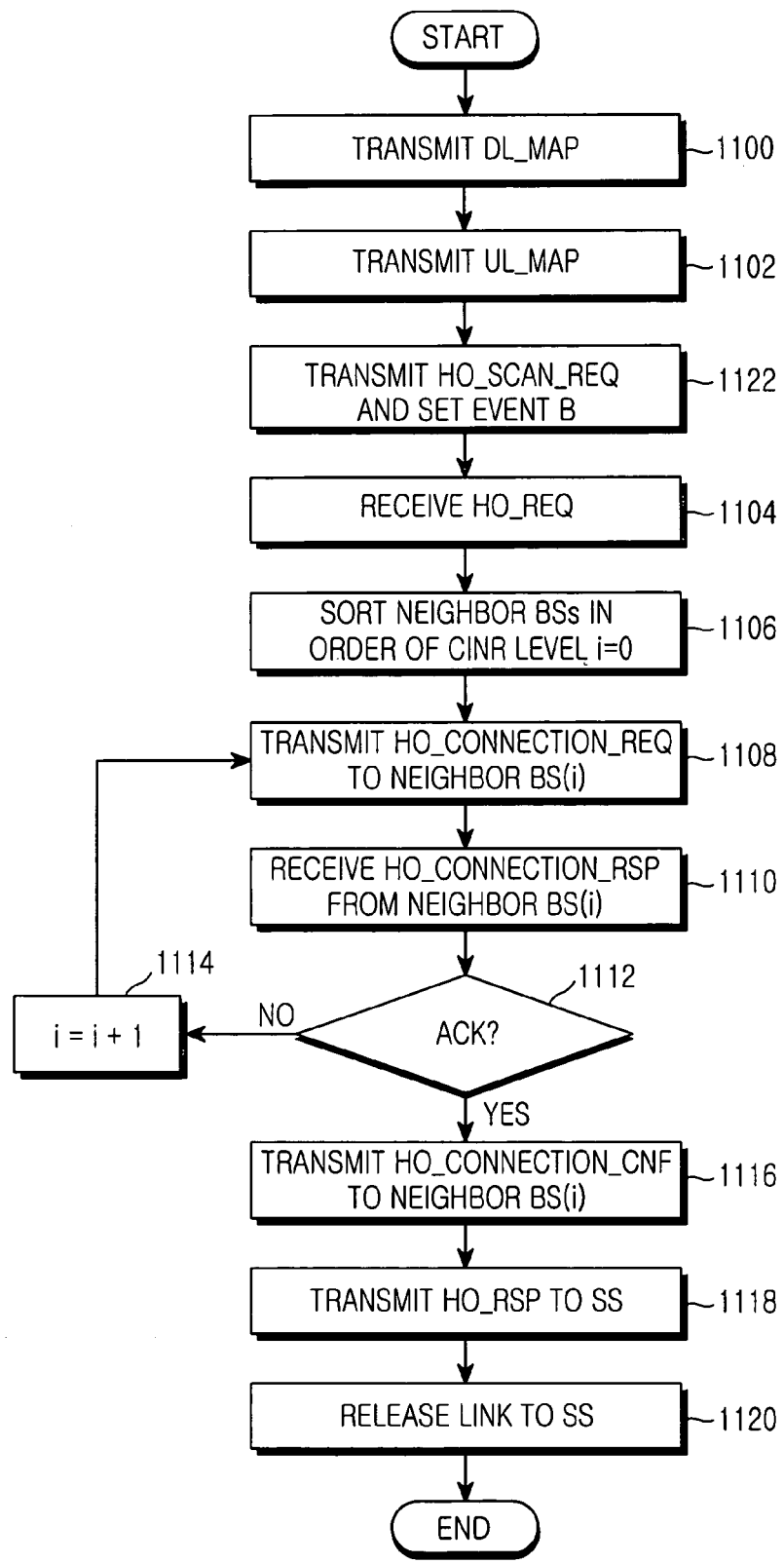
FIG. 11 is a flowchart illustrating a procedure for performing a handover by a serving base station in response to a handover request from a subscriber station according to an embodiment of the present invention.

FIG. 11 is a flowchart illustrating an operation of a serving base station according to an embodiment of the present invention. In steps 1100 and 1102, the serving base station transmits a DL_MAP message and a UL_MAP message to the subscriber station. When the serving base station desires to hand over the subscriber station as occasion demands, it transmits a handover scan request message to the subscriber station in step 1122. The handover scan request message has been described above with reference to Table 7.

Upon receiving the handover scan request message from the serving base station, the subscriber station transmits a handover request message to the serving base station. The serving base station then receives the handover request message from the subscriber station in step 1104. The configuration of the handover request message has been described above with reference to Table 8.

Thereafter, in step 1106, the serving base station sorts the neighbor base stations included in the handover request message, in order of their CINR level. As described with reference to FIG. 9, unique numbers of the neighbor base stations include BS_1 to MAX_BS_NUM. After completion of sorting the neighbor base stations, in step 1108, the serving base station transmits a handover connection request message to a neighbor base station (i.e., target base station) having the highest CINR among the sorted neighbor base stations. The configuration of the handover connection request message has been described above with reference to Table 9.

After transmitting the handover connection request message, serving base station receives in step 1110 a handover connection response message from the neighbor base station that transmitted the handover connection request message. The configuration of the handover connection response message has been described above with reference to Table 10.

Upon receiving the handover connection response message, the serving base station determines in step 1112 whether the target base station can support handover, i.e., received an ACK If it is determined that the target base station can support a handover, the serving base station proceeds to step 1116. However, if the target base station cannot support a handover, the serving base station proceeds to step 1114. In step 1114, the serving base station selects a neighbor base station having the second highest CINR, and then transmits the handover connection request message to the selected neighbor base station.

In step 1116, the serving base station transmits a handover connection confirmation message to an available target base station capable of supporting handover. The configuration of the handover connection confirmation message has been described above with reference to Table 12. After transmitting the handover connection confirmation message, the serving base station transmits a handover response message, which has been described with reference to Table 11, to the subscriber station in step 1118. The order of the steps 1116 and 1118 is changeable at a user's option. After steps 1116 and 1118, the serving base station releases a link (or call) connected to the subscriber station in step 1120.

As described above, in the proposed broadband wireless access communication system having a multi-cell configuration to support mobility of subscriber stations, a serving base station requests a subscriber station to perform handover to another base station in order to distribute calls of subscriber stations located in a overloaded cell. In the existing single-cell configuration, call distribution to another cell is unavailable, so an overloaded cell cannot accommodate subscriber stations. However, in the embodiment of the present invention, when a cell is overloaded, its serving base station requests subscriber stations to perform handover to another base station to distribute their calls, thereby making it possible to accommodate more subscriber stations.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for performing a handover of a subscriber station at a request of a serving base station in a broadband wireless access communication system including the serving base station for providing a service to the subscriber station and a plurality of neighbor base stations being adjacent to the serving base station, the method comprises the steps of:

receiving information on the neighbor base stations from the serving base station;

measuring carrier-to-interference and noise ratios (CINRs) of frequency bandwidth signals from the neighbor base stations based on the information about the neighbor base stations;

receiving a handover scan request message from the serving base station;

transmitting to the serving base station a handover request message including information about the measured CINRs of the selected neighbor base stations satisfying a predetermined handover condition, in response to the handover scan request message;

receiving, from the serving base station, a handover response message including information on at least one particular target base station among selected neighbor base stations, said at least one particular base station capable of supporting the handover of the subscriber station among the neighbor base stations; and performing the handover from the serving base station to one of the at least one target base stations;

wherein the predetermined handover condition comprises a first handover condition, in which a CINR of a particular neighbor base station should not remain less than a minimum CINR for a maximum holding time and a second handover condition, in which a CINR of a particular neighbor base station should remain greater than a measured CINR of the serving base station for a minimum holding time.

2. The method of claim 1, wherein the information about the neighbor base stations is included in a downlink message received from the serving base station.

3. The method of claim 1, further comprising the step of stopping the CINR measurement on neighbor base stations with CINRs not satisfying the first handover condition, among the measured CINRs of the neighbor base stations.

4. The method of claim 1, wherein the handover request message is transmitted to the serving base station along with the CINRs of the neighbor base stations, a quality of service (QoS), and a bandwidth.

5. A method for performing a handover by a serving base station in a broadband wireless access communication system including the serving base station for providing a service to a subscriber station and a plurality of neighbor base stations being adjacent to the serving base station, the method comprising the steps of:

(a) transmitting information on the neighbor base stations to the subscriber station;

(b) transmitting a handover scan request message for handover request to the subscriber station, if a handover of the subscriber station is required;

(c) receiving a handover request message including carrier-to-interference and noise ratios (CINRs) of the neighbor base stations from the subscriber station in response to the handover scan request message;

(d) sorting the neighbor base stations in order determined by the received CINR levels;

(e) sequentially sending a handover connection request to the neighbor base stations in the sorted order; and (f) transmitting information on at least one particular neighbor base station among the neighbor base stations to the subscriber station upon receiving a handover connection response including ACK (Acknowledgement) information from the particular neighbor base station in response to the handover connection request, said at least one particular base station capable of supporting the handover of the subscriber station among the neighbor base station;

wherein step (e) comprises sending the handover connection request to the neighbor base stations according to an order beginning with a neighbor base station corresponding to a highest CINR to a neighbor base station corresponding to a lowest CINR, until the handover connection response including the ACK information is received.

6. The method of claim 5, further comprising the step of receiving a handover request from the subscriber station, including measured CINRs of the neighbor base stations, a quality of service (QoS), and a bandwidth.

7. The method of claim 6, wherein the handover connection request is transmitted to the neighbor base stations including the QoS and the bandwidth by the subscriber station.

8. The method of claim 5, wherein the information about the at least one particular neighbor base station includes an identifier and a carrier frequency of the particular neighbor base station.

9. The method of claim 5, further comprising the step of transmitting a handover connection confirm message to the at least one particular neighbor base station, upon receiving the handover connection response message including the ACK information from the particular neighbor base station.

10. The method of claim 5, further comprising the step of releasing a link connected to the subscriber station, after transmitting the information about the particular neighbor base station.

11. A broadband wireless access communication system comprising:

a subscriber station for transmitting a request for a handover to at least one neighbor base station having a carrier-to-interference and noise ratio (CINR) satisfying a handover condition, in response to a handover scan request message, and performing the handover to a particular neighbor base station of the at least one neighbor base stations that transmits a handover response in response to a handover request;

a serving base station, which is currently in communication with the subscriber station, for receiving the request for the handover, transmitting the handover scan request message to the subscriber station, if handover of the subscriber station is required, sending a handover connection request to the neighbor base stations in an order determined by CINRs reported from the subscriber station, and sending, to the subscriber station, handover information, upon receiving a handover connection response including ACK (Acknowledgement) information; and a particular neighbor base station from the at least one neighbor base stations for determining whether it can support the handover of the subscriber station, in response to the handover connection request, and sending the handover connection response including the ACK information to the serving base station, if it can support the handover of the subscriber station;

wherein the handover condition comprises a first handover condition, in which a CINR of the particular neighbor base station should not remain less than a minimum CINR for a maximum holding time and a second handover condition, in which a CINR of the particular neighbor base station should remain greater than a measured CINR of the serving base station for a minimum holding time.

12. The broadband wireless access communication system of claim 11, wherein CINR measurement on neighbor base stations with CINRs not satisfying the first handover condition among the measured CINRs of the neighbor base stations, is suspended.

13. The broadband wireless access communication system of claim 12, wherein the subscriber station sends the handover request to the serving base station, if at least one of the measured CINRs of the at least one neighbor base stations is higher than a predetermined threshold and a CINR of the serving base station.

14. A broadband wireless access communication system comprising:

a serving base station for transmitting information on the neighbor base stations to the subscriber station, transmitting a handover scan request message to the subscriber station, if a handover of the subscriber station is required, receiving a handover request message including carrier-to-interference and noise ratios (CINRs) of the neighbor base stations from the subscriber station in response to the handover scan request message, sorting the neighbor base stations in order determined by the received CINR levels, sequentially sending a handover connection request to the neighbor base stations in the sorted order, transmitting information on at least one particular neighbor base station among the neighbor base stations to the subscriber station upon receiving a handover connection response including ACK (Acknowledgement) information from the particular neighbor base station in response to the handover connection request, said at least one particular base station capable of supporting the handover of the subscriber station among the neighbor base stations, and sending the handover connection request to the neighbor base stations according to an order beginning with a neighbor base station corresponding to a highest CINR to a neighbor base station corresponding to a lowest CINR until the handover connection response including the ACK information is received.

15. The broadband wireless access communication system of claim 14, wherein the serving base station receives a handover request from the subscriber station, including measured CINRs of the neighbor base stations, a quality of service (QoS), and a bandwidth.

16. The broadband wireless access communication system of claim 15, wherein a connection request, including the QoS and the bandwidth is transmitted to the neighbor base stations by the subscriber station.

17. The broadband wireless access communication system of claim 14, wherein the information about the particular neighbor base station includes an identifier and a carrier frequency of the particular neighbor base station.

18. The broadband wireless access communication system of claim 14, wherein the serving base station transmits a handover connection confirm message to the particular neighbor base station, upon receiving the handover connection response message including the ACK information from the particular neighbor base station.

* * * * *